United States Patent
Clemen, Jr. et al.

(10) Patent No.: US 12,461,813 B2
(45) Date of Patent: Nov. 4, 2025

(54) RADIATION INDUCED ERROR DETECTION IN SOLID-STATE DEVICES

(71) Applicant: The Boeing Company, Arlington, VA (US)

(72) Inventors: Mark Joseph Clemen, Jr., Port Orchard, WA (US); Ethan Cannon, Seattle, WA (US); Manuel F. Cabanas-Holmen, Roy, WA (US)

(73) Assignee: The Boeing Company, Arlington, VA (US)

( * ) Notice: Subject to any disclaimer, the term of this patent is extended or adjusted under 35 U.S.C. 154(b) by 44 days.

(21) Appl. No.: 18/307,743

(22) Filed: Apr. 26, 2023

(65) Prior Publication Data
US 2024/0362112 A1    Oct. 31, 2024

(51) Int. Cl.
*G06F 11/10*    (2006.01)
*G11C 29/12*    (2006.01)
*G11C 29/42*    (2006.01)

(52) U.S. Cl.
CPC ........ *G06F 11/1068* (2013.01); *G06F 11/106* (2013.01); *G11C 29/12005* (2013.01); *G11C 29/42* (2013.01)

(58) Field of Classification Search
CPC ............... G06F 11/1068; G06F 11/106; G11C 29/12005; G11C 29/42
USPC ....................................................... 714/773
See application file for complete search history.

(56) References Cited

U.S. PATENT DOCUMENTS

| | | | |
|---|---|---|---|
| 7,360,132 B1* | 4/2008 | Vemula .................. | G11C 29/72 714/E11.046 |
| 8,145,959 B2* | 3/2012 | Mims ............... | G01R 31/31816 714/719 |
| 9,971,045 B2* | 5/2018 | Lu ........................... | G01T 1/245 |
| 11,238,943 B1* | 2/2022 | Ray .................... | G11C 16/0408 |
| 2003/0234430 A1* | 12/2003 | Friend ................ | H01L 27/1203 716/112 |
| 2007/0211527 A1 | 9/2007 | Hsu et al. | |
| 2009/0271675 A1* | 10/2009 | Dickson ............... | G01R 31/311 714/732 |
| 2011/0099440 A1* | 4/2011 | Mims ..................... | G06F 11/24 714/724 |
| 2011/0275356 A1* | 11/2011 | Best .................... | H04W 36/385 455/414.1 |

(Continued)

*Primary Examiner* — James C Kerveros
(74) *Attorney, Agent, or Firm* — Harrity & Harrity, LLP

(57) ABSTRACT

A solid-state device having a substrate that receives an ionizing radiation, logic circuits, integrity circuits, and a collection circuit. The logic circuits are operational to perform logic functions. The logic circuits are located in an area on the substrate, and are individually susceptible to a possible corruption by the ionizing radiation. Each integrity cell is initialized to a predetermined state. The integrity cells are located in the area on the substrate, arranged in a pattern neighboring the logic circuits, and individually susceptible to disrupting the predetermined state in response to the ionizing radiation. The collection circuit is located on the substrate. The collection circuit is operational to read the plurality of integrity cells, and assert a report signal that identifies the possible corruption in a subset of the logic circuits due to the ionizing radiation in response to reading an incorrect state in a neighboring one of the integrity cells.

20 Claims, 5 Drawing Sheets

(56) References Cited

U.S. PATENT DOCUMENTS

2013/0335875 A1 12/2013 Baumann
2017/0082689 A1 3/2017 Gaspard et al.

* cited by examiner

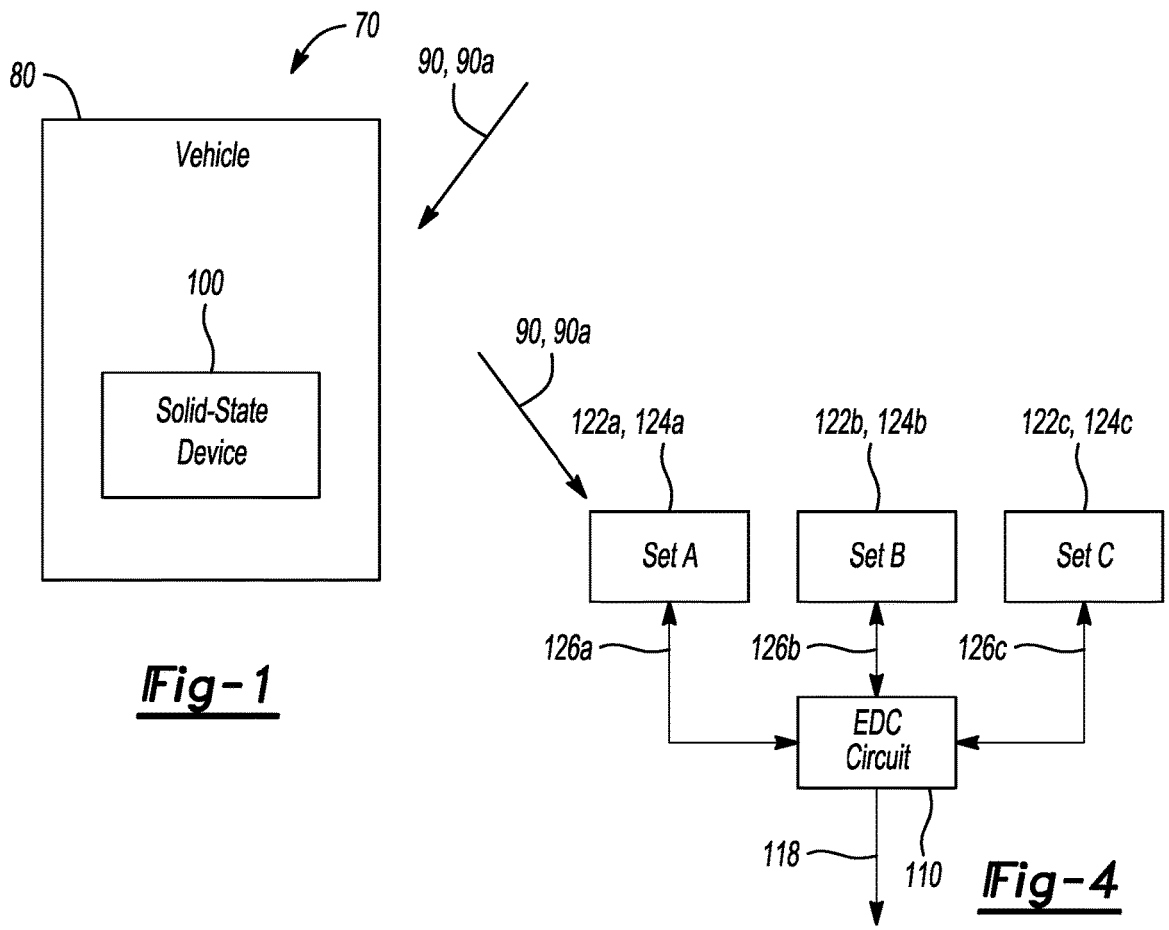
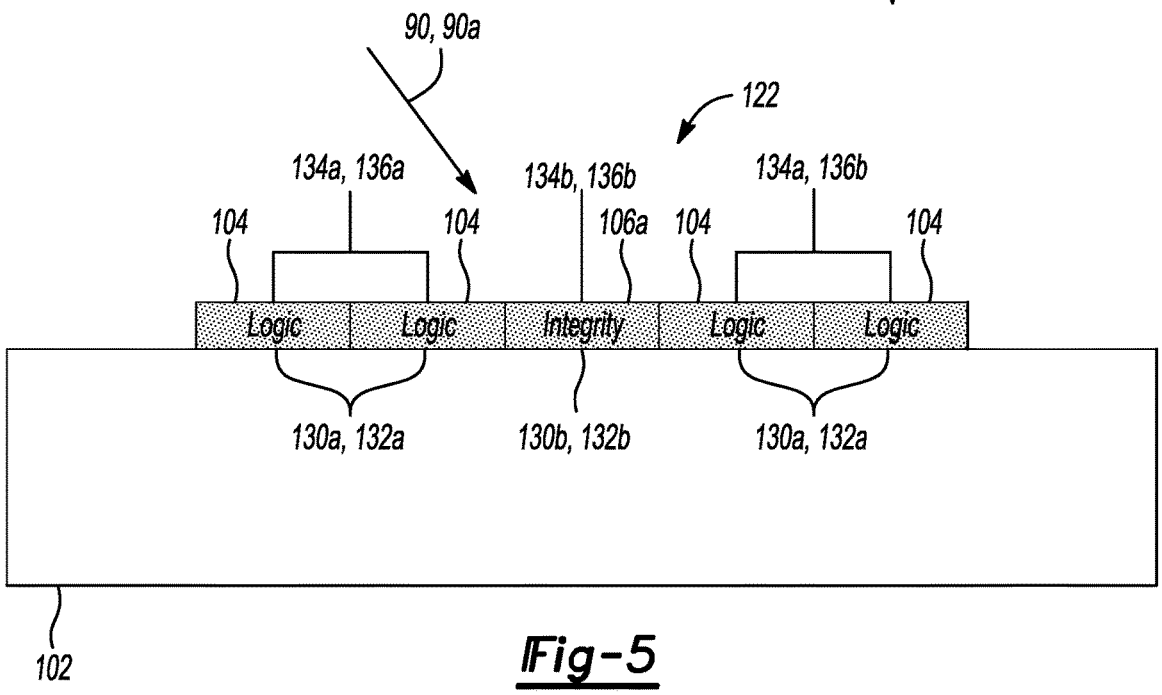

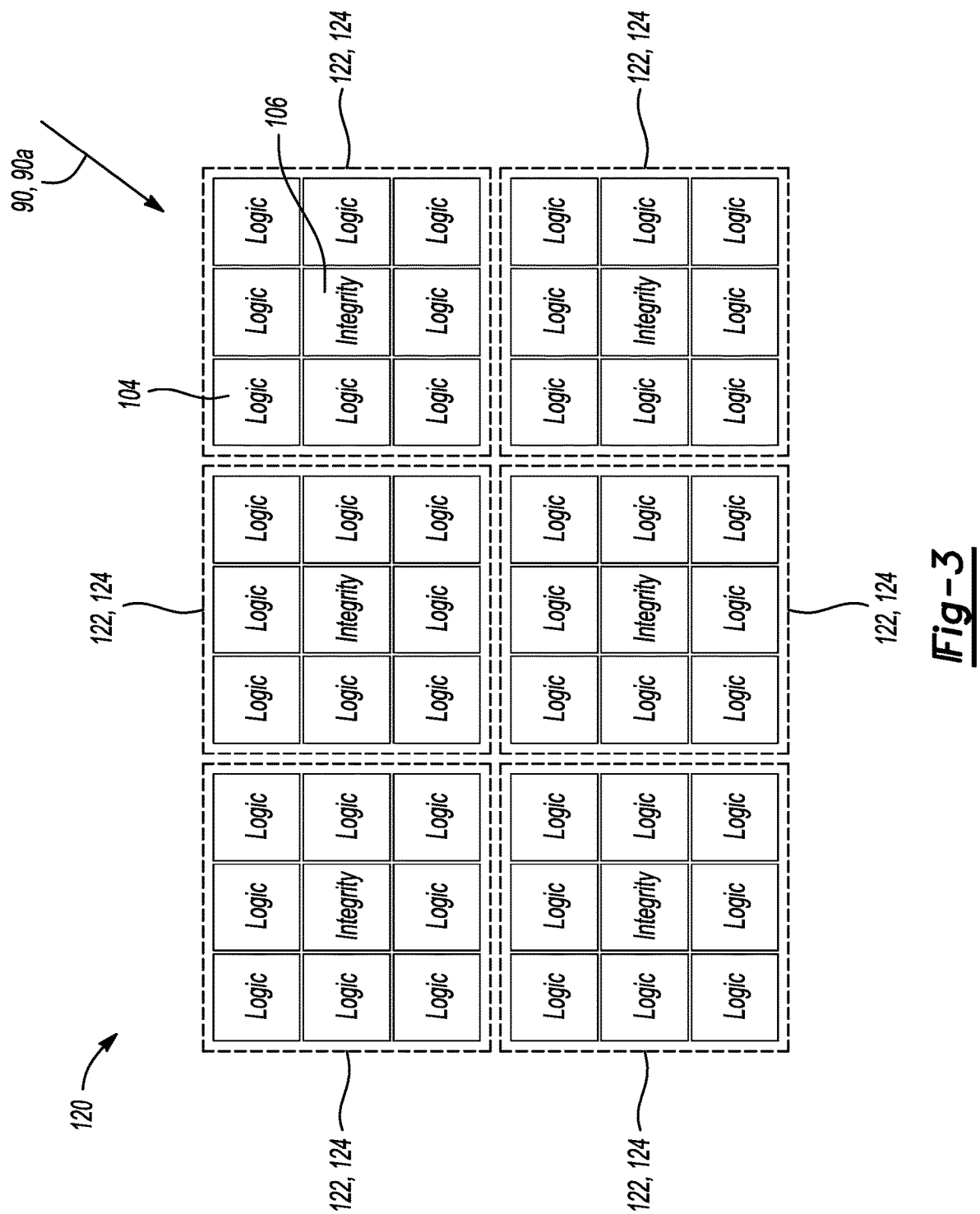

Fig-6

RADIATION INDUCED ERROR DETECTION IN SOLID-STATE DEVICES

TECHNICAL FIELD

The disclosure relates generally to solid-state device data integrity, and in particular, to radiation induced error detection in solid-state devices.

BACKGROUND

Some modern semiconductor electronics are highly integrated with arrays of memory, logic gates, digital clocks, and support circuitry. In radiation environments, the electronics are susceptible to "soft" errors, such as upset, and "hard" errors, affecting reliability, that may be localized to a single bit or gate location. A single heavy ion (such as may be incident in the space environment) or a single secondary, heavy ion (such as may be scattered by a proton or neutron in space, in the atmosphere or on the ground) causes a heavily ionized deposition of charges along a track. The track may be sufficient to cause memory errors or functional errors in the logic.

Accordingly, those skilled in the art continue with research and development efforts in the field of developing solid-state devices subject to induced errors in radiation environments.

SUMMARY

A solid-state device is provided herein. The solid-state device includes a substrate, a plurality of logic circuits, a plurality of integrity cells, and a collection circuit. The substrate receives an ionizing radiation. The plurality of logic circuits are operational to perform a plurality of logic functions. The plurality of logic circuits are located in an area on the substrate, and individually susceptible to a possible corruption by the ionizing radiation. The plurality of integrity cells are each initialized to a predetermined state. The plurality of integrity cells are located in the area on the substrate, arranged in a pattern neighboring the plurality of logic circuits, and individually susceptible to disruption of the predetermined state in response to the ionizing radiation. The collection circuit is located on the substrate. The collection circuit is operational to read the plurality of integrity cells, and assert a report signal that identifies the possible corruption in a subset of the plurality of logic circuits due to the ionizing radiation in response to reading an incorrect bit in a neighboring one of the plurality of integrity cells.

In one or more embodiments of the solid-state device, the plurality of integrity cells are powered by a lower power supply voltage than the plurality of logic circuits; and the lower power supply voltage causes the plurality of integrity cells to be more susceptible to disruption than the possible corruption of the plurality of logic circuits due to the ionizing radiation.

In one or more embodiments of the solid-state device, the collection circuit is further operational to reset a particular integrity cell of the plurality of integrity cells to the predetermined state in response to reading the incorrect bit from the particular integrity cell.

In one or more embodiments, the solid-state device includes an error detection and correction circuit operational to verify the possible corruption in the subset of the plurality of logic circuits in response to the report signal.

In one or more embodiments of the solid-state device, the error detection and correction circuit is further operational to correct the possible corruption in the subset of the plurality of logic circuits in response to verification of an actual corruption.

In one or more embodiments of the solid-state device, the error detection and correction circuit is operational to respond to the possible corruption by one or more of (i) selection of a redundant subset of the plurality of logic circuits, (ii) an application of an error correction code to data in the subset, (iii) scrubbing the data in the subset, and (iv) resetting the data in the subset.

In one or more embodiments of the solid-state device, the pattern locates each of the plurality of integrity cells neighboring one to eight of the plurality of logic circuits.

In one or more embodiments of the solid-state device, the plurality of integrity cells have a difference in one or more of a technology and a layout than the plurality of logic circuits; and the difference causes the plurality of integrity cells to be more susceptible to disruption due to the ionizing radiation than the possible corruption of the plurality of logic circuits due to the ionizing radiation.

In one or more embodiments of the solid-state device, each of the plurality of integrity cells is sensitive to the ionizing radiation in a volume of approximately one cubic micrometer in the substrate.

In one or more embodiments of the solid-state device, a higher power supply voltage of the plurality of integrity cells relative to a lower power supply voltage the plurality of logic circuits establishes a plurality of electric fields; and the electric fields direct a plurality of ions created by the ionizing radiation away from the plurality of logic circuits.

A method for detecting radiation induced errors in a solid-state device is provided herein. The method includes receiving an ionizing radiation in a substrate of the solid-state device; and performing a plurality of logic functions with a plurality of logic circuits. The plurality of logic circuits are located in an area on the substrate, and individually susceptible to a possible corruption due to the ionizing radiation. The method includes initializing each of a plurality of integrity cells to a predetermined state. The plurality of integrity cells are located in the area on the substrate, arranged in a pattern neighboring the plurality of logic circuits, and individually susceptible to disruption of the predetermined state in response to the ionizing radiation. The method further includes reading the plurality of integrity cells with a collection circuit located on the substrate; and asserting a report signal that identifies the possible corruption in a subset of the plurality of logic circuits due to the ionizing radiation in response to reading an incorrect bit in a neighboring one of the plurality of integrity cells.

In one or more embodiments, the method includes powering the plurality of integrity cells with a lower power supply voltage than the plurality of logic circuits. The lower power supply voltage causes the plurality of integrity cells to be more susceptible to disruption than the possible corruption of the plurality of logic circuits due to the ionizing radiation.

In one or more embodiments, the method includes resetting a particular integrity cell of the plurality of integrity cells to the predetermined state in response to reading the incorrect bit from the particular integrity cell.

In one or more embodiments, the method includes verifying the possible corruption in the subset of the plurality of logic circuits with an error detection and correction circuit in response to the report signal.

In one or more embodiments, the method includes correcting the possible corruption in the subset of the plurality of logic circuits in response to verification of an actual corruption by the error detection and correction circuit.

In one or more embodiments, the method includes sensing the ionizing radiation in a volume of approximately one cubic micrometer in the substrate with each of the plurality of integrity cells.

A solid-state device is provided herein. The solid-state device includes a substrate, a plurality of logic circuits, and a plurality of integrity cells. The substrate receives an ionizing radiation. The plurality of logic circuits are operational to perform a plurality of logic functions. The plurality of logic circuits are located in an area on the substrate, and individually susceptible to the ionizing radiation. The plurality of integrity cells are located in the area on the substrate, arranged in a pattern neighboring the plurality of logic circuits, and voltage biased relative to the plurality of logic circuits to establish a plurality of electric fields. The plurality of electric fields direct a plurality of ions created by the ionizing radiation away from the plurality of logic circuits.

In one or more embodiments of the solid-state device, the ionizing radiation creates a plurality of negative ions and a plurality of positive ions in the substrate; the plurality of integrity cells receive a higher power supply voltage than the plurality of logic circuits; and the plurality of electric fields created by the higher power supply voltage attract the plurality of negative ions away from the plurality of logic circuits.

In one or more embodiments, the solid-state device includes a conductive plane located on the substrate, and operational to attract the plurality of positive ions away from the plurality of logic circuits.

In one or more embodiments of the solid-state device, the plurality of integrity cells are more probable than the plurality of logic circuits to be upset by the ionizing radiation.

The above features and advantages, and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic perspective diagram of an environment around a vehicle in accordance with one or more exemplary embodiments.

FIG. 3 is a schematic plan diagram of a pattern of logic circuits and integrity cells in accordance with one or more exemplary embodiments.

FIG. 4 is a schematic diagram of redundant sets of circuits in accordance with one or more exemplary embodiments.

FIG. 5 is a schematic cross-sectional diagram of a set of circuits in accordance with one or more exemplary embodiments.

FIG. 6 is a schematic cross-sectional diagram of voltage biasing in accordance with one or more exemplary embodiments.

DETAILED DESCRIPTION

Figure 2:
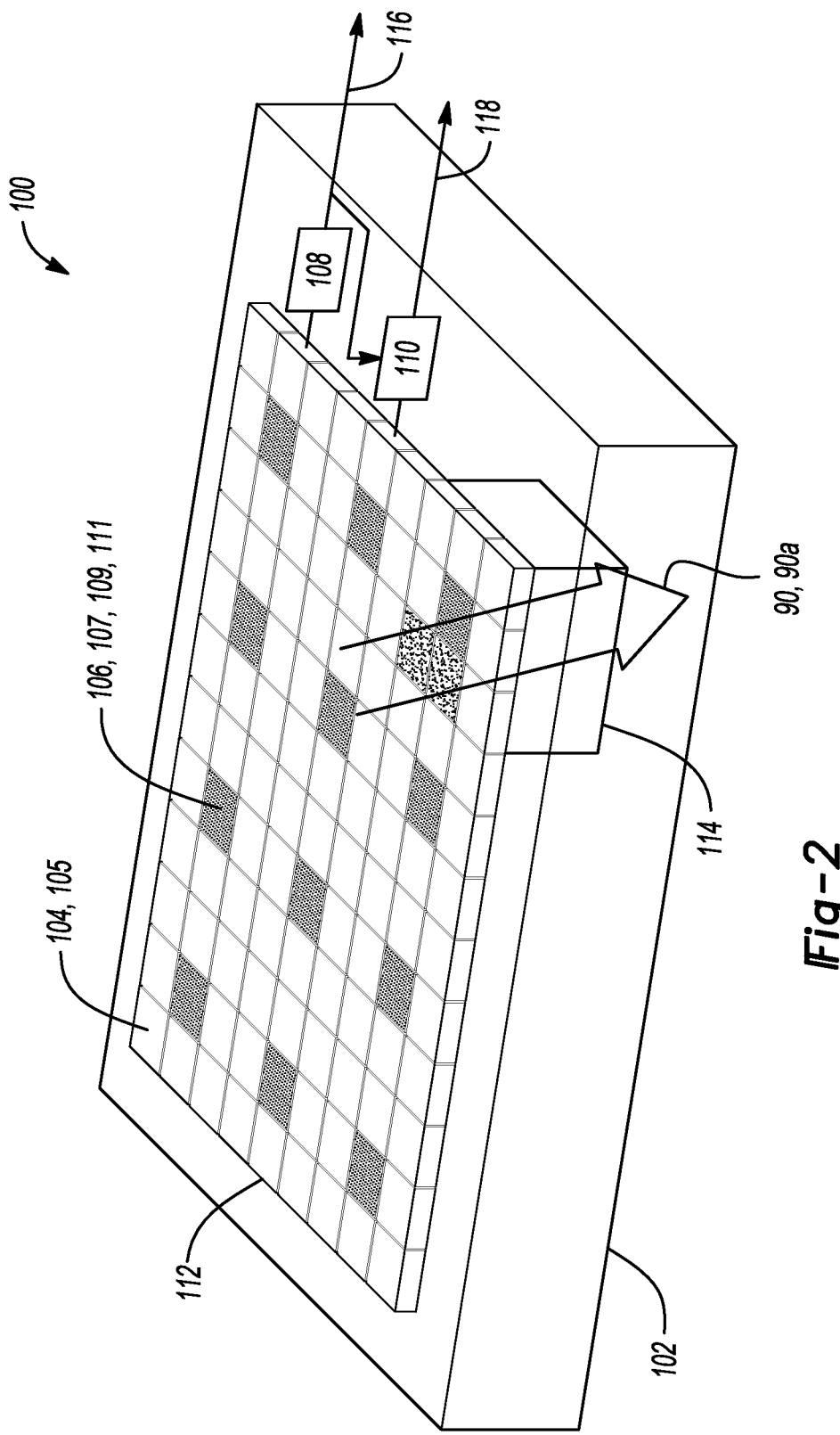
FIG. 2 is a schematic perspective diagram of a solid-state device in accordance with one or more exemplary embodiments.

Embodiments of the present disclosure include a system and/or method to help ensure solid-state logic and data integrity in a radiation environment. The system/method provide an integrated fault detection mechanism for local errors caused by the radiation. The integrated fault detection may be a pattern of integrity cells that are individually susceptible to state disruptions (e.g., a bit flip) in response to ionization caused by the radiation. Where an integrity cell is disrupted by the ionization, the physically neighboring logic circuits are suspected of containing errors. Correction of such errors may be focused in the local neighborhood where the radiation was detected. In various embodiments, the ion disruption may be reduced by creating electrical fields within a device substrate that guides the radiation-induced ions away from logic circuits to an integrity cell.

Referring to FIG. 1, a schematic perspective diagram of an example implementation of an environment 70 around a vehicle 80 is shown in accordance with one or more exemplary embodiments. The environment 70 may include radiation 90 that interacts with the vehicle 80. The vehicle 80 generally includes a solid-state device 100. The radiation 90 may interact with the solid-state device 100.

The environment 70 generally includes an atmospheric environment and a space environment (e.g., a vacuum) of above the atmosphere. The vehicle 80 resides in the environment 70. The vehicle 80 may include, but is not limited to, a ground vehicle, an airborne vehicle, and/or a space vehicle. The vehicle 80 is configured to carry one or more occupants (or crew members).

The radiation 90 is generally in the form of subatomic particles and electromagnetic radiation. The radiation 90 may include, but is not limited to, Gamma rays, X-rays, high energy ultraviolet light, protons, neutrons, alpha particles, beta particles, and heavy ions. The radiation 90 may cause damage to the solid-state device 100 in the form of ionization damage and displacement damage. The ionization damage is caused by ionizing radiation 90a. The ionizing radiation 90a is operational to create trails of ion pairs while passing through the solid-state device 100. Energy absorbed by electronic ionization in insulating layers and the substrate 102 liberate charge carriers. The charge carriers diffuse and/or drift to other locations where trapped, or alter locally-stored charge concentrations resulting in improper functionality of the circuitry. For the displacement damage, the radiation 90, 90a may displace atoms in the substrate 102 from lattice sites. The resulting defects alter the electronic characteristics of the crystal and the circuitry fabricated therein. Even without induced defects or damage, an interaction with a radiation particle may cause electronic state disruption.

The solid-state device 100 implements one or more circuits fabricated on (or in) one or more semiconductor substrates. The solid-state device 100 includes logic circuits and power distribution circuits. The logic circuits are generally susceptible to disruption by the radiation 90, 90a. In various embodiments, the logic circuits are subject to performance degradation and failure due to the radiation 90, 90a. For example, one or more gates of a logic cell may become stuck-at a fixed logic level instead of transitioning between two logic levels at various times. In other embodiments, memory-type logic circuits are subject to state disruptions due to the radiation 90, 90a. For example, a memory cell programmed (or written) to a particular logic level (e.g., a logical zero or a logical one) may be changed by the radiation 90, 90a to read as a logic level opposite the particular logic level as programmed.

Referring to FIG. 2, a schematic perspective diagram of an example embodiment of the solid-state device 100 is shown in accordance with one or more exemplary embodiments. The solid-state device 100 generally includes a substrate 102, multiple logic circuits 104, multiple integrity cells 106, a collection circuit 108, and an error detection and correction (EDC) circuit 110.

The logic circuits 104 may be arranged within an area 112 on a surface of the substrate 102. The integrity cells 106 are located interspaced among the logic circuits 104 in a predetermined pattern. The collection circuit 108 is located on the substrate 102 and may be disposed outside the area 112. The error detection and correction circuit 110 is located on the substrate 102 and may also be disposed outside the area 112.

The substrate 102 is formed of a semiconductor. The semiconductor generally includes silicon, germanium, gallium arsenide, aluminum gallium arsenide, silicon carbide, gallium nitride, indium phosphide, and the like. The substrates may be in the form of a semiconductor die, a semiconductor tile, or a semiconductor wafer.

The logic circuits 104 implement digital and/or analog functional circuits formed on (or in) the substrate 102. The logic circuits 104 may perform one or more logic functions 105. The logic circuits 104 include, but are not limited to, memory cells, arithmetic circuits, flip-flops, Boolean logic, clocking circuits, input/output circuits, amplifiers, voltage-level translation circuits, converters, oscillators, and the like. The logic circuits 104 are susceptible to being disrupted by the radiation 90, 90a striking the substrate 102.

The integrity cells 106 implement ionization collection and/or detection circuits formed on (or in) the substrate 102. The integrity cells 106 may perform one or more integrity functions 107. The integrity cells 106 may be initialized to a predetermined state 109 (e.g., a predetermined logical bit). Where corrupted by the radiation 90, 90a, the integrity cells 106 may have an incorrect bit 111. The integrity cells 106 may include, but are not limited to, memory cells, flip-flops, charge-coupled cells, and the like. The integrity cells 106 are susceptible to being disrupted by the radiation 90, 90a striking the substrate 102. In various embodiments, the integrity cells 106 are operational to be programmed to a normal state. The normal state is detectable as a normal bit. Upon being exposed to nearby ion trails generated by the ionizing radiation 90a, a given integrity cell 106 may become corrupted and change to a corrupted state. The corrupted state is detectable as an incorrect bit. Thereafter, the given integrity cell 106 may be commanded back to the normal state. The integrity cells 106 are sensitive to the ionizing radiation 90a in a volume 114 of approximately one cubic micrometer in the substrate 102 beneath the integrity cells 106. The integrity cells 106 are more probable than the logic circuits 104 to be upset by the ionizing radiation 90a.

The collection circuit 108 implements sampling circuitry formed on (or in) the substrate 102. The collection circuit 108 is operational to read (or sample) the states of the integrity cells 106. The collection circuit 108 may assert a report signal 116 in response to reading an incorrect bit in a particular integrity cell 106 that neighbors a few integrity cells 106. The incorrect bit identifies a possible corruption in a subset of neighboring logic circuits 104 due to the ionizing radiation 90a. The collection circuit 108 may also be operational to command (or program) the integrity cell 106 reporting the incorrect bit back to the normal state.

The EDC circuit 110 implements an error correction technique and an error correction technique in circuitry formed on (or in) the substrate 102. The EDC circuit 110 is operational to read (or sample) the states of several logic circuits 104 that neighbor an integrity cell 106. The reading may be triggered by the assertion of the report signal 116 for the integrity cell, periodically, and/or by another event that attempts to read one or more of the several logic circuits 104 around the integrity cell 106. Once the states of the several logic circuits 104 are read, the EDC circuit 110 may verify if errors exist, and if so, correct the errors among the several logic circuits 104 using common error correction techniques to reconstruct the original error-free data. The error-free data is presented in a correct signal 118.

Consider designs where the logic circuits 104 are memory circuits, if the states in the several memory circuits are data bits written with an error correction code, the EDC circuit 110 may use the error correction code to detect and correct a single-bit error in the data. In another example, memory bits in a single function or memory word may be widely spaced among the memory cells to avoid multiple cell corruption within the function or word. The EDC circuit 110 may be operational to detect and correct single cell errors within the widely spaced bits. In some embodiments, the memory cells may be read out in parallel with the rest of the memory and the integrity cells 106 act as "parity-like" bits indicating whether the data may be corrupted or not. Data in the memory cells may be interleaved with the EDC circuit 110 performing error detection and correction. In some cases, the EDC circuit 110 may force a Cyclic Redundancy Check (CRC) on the memory cells and force a memory update from a trusted source where the Cyclic Redundancy Check indicates an uncorrectable situation.

The several logic circuits 104 may be associated with a redundant bank of logic circuits 104. In such cases, the EDC circuit 110 fetches two parallel sets of data and selects, on a word-by-word basis, which bank is uncorrupted based on the integrity cells 106. In still other designs, the selection may be among functional logic circuits in an array. The EDC circuit 110 may use the states of the neighboring integrity cells 106 to select the functional logic circuits that were probably not corrupted by the radiation 90, 90a. In some embodiments, if a primary logic circuit 104 shows possible corruption based on the neighboring integrity cell 106, then the state of a backup logic circuit 104 performing the same function may be used instead (e.g., "duplicate" voting). If both logic circuits 104 (the primary and the duplicate backup) show corruption, then a large-scale reset or scrubbing by the EDC circuit 110 is warranted. Other designs of the EDC circuit 110 may also be applied to impose more elaborate consequences of detected corruption, including localized data scrubbing, localized error correction, and others.

Referring to FIG. 3, a schematic plan diagram of an example pattern 120 of logic circuits and integrity cells is shown in accordance with one or more exemplary embodiments. In the example, the logic circuit 104 are arranged in a grid-like pattern 120 as adjacent N×N (e.g., 3×3) sets 122. Each set 122 locates a subset 124 of several (e.g., one to eight) logic circuits 104 surrounding and adjacent to an integrity cell 106 located in a center of the set 122. The sets 122 are generally sized to match the volume 114 susceptible to the radiation 90, 90a if the radiation 90, 90a strikes in the middle of the set 122. As such, the integrity cell 106 in the middle of the set 122 should detect a radiation strike within the respective set 122. A detected radiation strike makes the functionality/data in the subset 124 of the neighboring logic circuits 104 questionable. A radiation strike near an edge of a set 122 may be detected by the respective integrity cell 106 and a nearby integrity cell 106, in which case both subsets 124 of logic circuits 104 may be treated as corrupt.

In situations where a size of the logic circuits 104 at the surface of the substrate 102 is smaller than in the example, the N×N pattern 120 may be a 3×4 pattern, a 3×5 pattern, a 4×5 pattern, or a 5×5 pattern of logic circuits 104. For the 5×5 pattern case, 24 logic circuits 104 may completely surround a single integrity cell 106. Where the integrity cell 106 detects the radiation 90, 90a, the 24 logic circuits 104 in the set may be possibly compromised.

Referring to FIG. 4, a schematic diagram of an example implementation of redundant sets is shown in accordance with one or more exemplary embodiments. The sets 122a-122c of logic circuits 104 may be operated in parallel as redundant copies of each other. Each set 122a-122c includes a subset 124a-124c of the logic circuits 104 and a corresponding integrity cell 106. Data in a given set 122a-122c may include data from the logic circuits 104 and data from the integrity cell 106. Data in a given subset 124a-124c may be limited to the data from the logic circuits 104.

The EDC circuit 110 may either rely on a single set (e.g., a primary set 122a or primary subset 124a) to produce valid data/results 126a. The EDC circuit 110 may present the valid data/results 126a in the correct signal 118. If the primary set 122a/subset 124a is potentially corrupted by radiation 90, 90a (as reported by the respective integrity cell 106, the EDC circuit 110 may rely on another set (e.g., a redundant set 122b or a redundant subset 124b) to produce valid data/results 126b in the correct signal 118. In other embodiments, the EDC circuit 110 may receive the data/results 126a-126c from multiple (e.g., three) sets 122a-122c or subsets 124a-124c. If two of the three data/results 126a-126c match each other, the matching data/results 126a-126c is selected as valid and presented in the correct signal 118.

Referring to FIG. 5, a schematic cross-sectional diagram of an example implementation of a set 122 is shown in accordance with one or more exemplary embodiments. The example illustrates a 3×3 pattern 120 in the substrate 102, with an integrity cell 106 (e.g., particular integrity cell 106a) bracketed on each side by a logic circuit 104. In various embodiments, the logic circuits 104 are fabricated using a first technology 130a and/or a first layout 132a. The particular integrity cell 106a is fabricated using a second technology 130b and/or a second layout 132b. In some embodiments, the logic circuits 104 may receive a first electrical power 134a and the particular integrity cell 106a receives a second electrical power 134b.

The particular integrity cell 106a is created to be more sensitive to the radiation 90, 90a than the logic circuits 104. The second technology 130b used to create the particular integrity cell 106a may be different from the first technology 130a used to create the logic circuits 104. For example, memory cell designs used in the particular integrity cell 106a may have a thicker gate oxide for transistors than the gate oxides used in the logic circuits 104. The thicker gate oxides create smaller channels below the gates and so have fewer stored charges in the normal state. Therefore, the ionizing radiation 90a may flip (or change) the state of the memory cell designs more readily than in the logic circuits 104.

The second layout 132b used to create the particular integrity cell 106a may be different from the first layouts 132a used for the logic circuits 104. By way of example, the first layouts 132a of the logic circuits 104 may include isolation trenches that minimize the drift of ions into sensitive areas of the circuitry. In contrast, the second layout 132b of the particular integrity cell 106a lacks the isolation trenches and thus is more likely to be corrupted by drifting ions.

The integrity cells 106 may be powered by a lower power supply voltage than the logic circuits 104. The first electrical power 134a (or first bias voltage) of the logic circuits 104 may be higher than the second electrical power 134b (or second bias voltage) of the particular integrity cell 106a. The first electrical power 134a may have a higher power supply voltage 136a than the lower power supply voltage 136b of the second electrical power 134b. Thus, the higher-voltage logic circuits 104 are less likely to be corrupted by radiation induced ions than the lower-voltage integrity cells 106, even where the first technology 130a matches the second technology 130b and/or the first layout 132a matches the second layout 132b.

Figure 6:
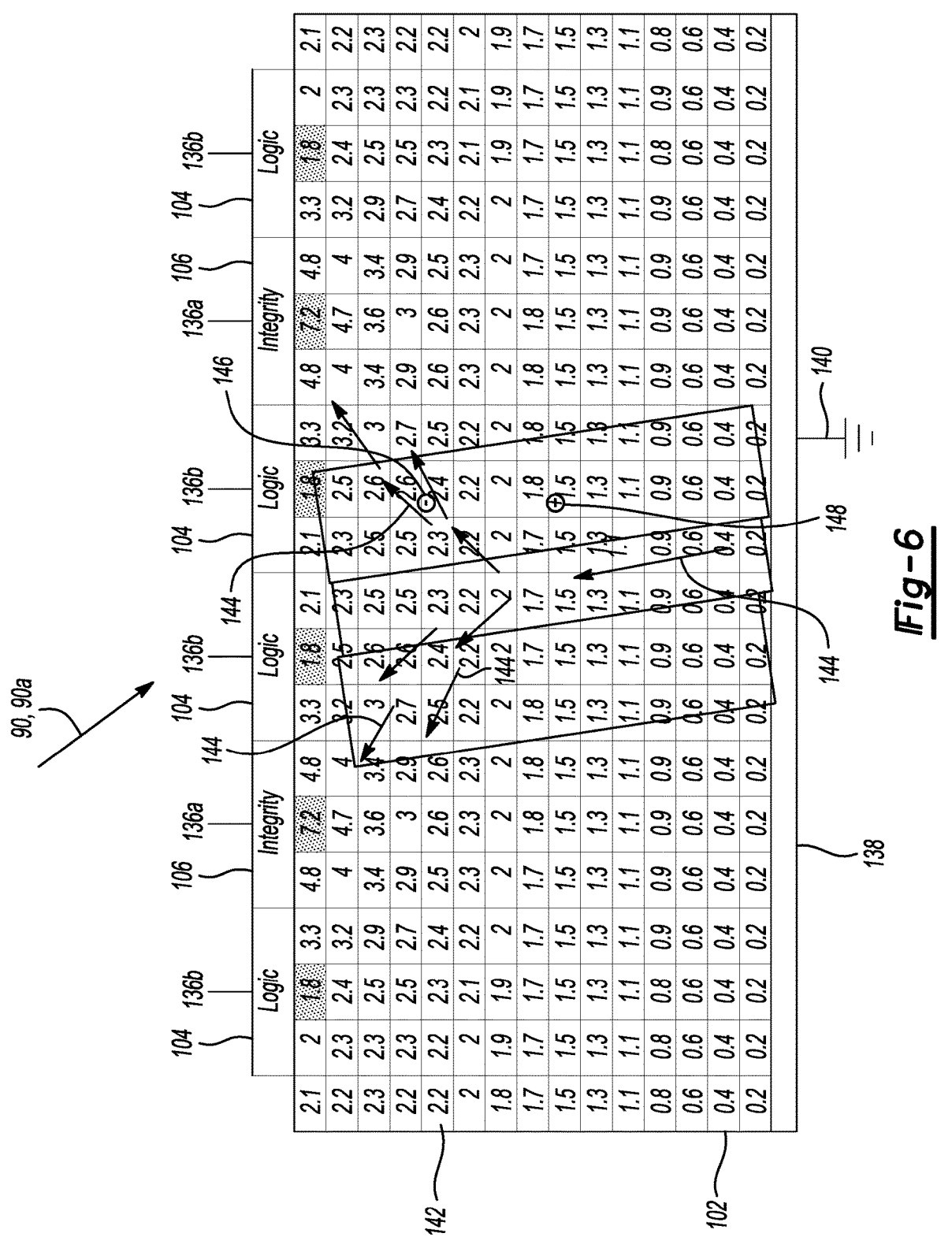

Referring to FIG. 6, a schematic cross-sectional diagram of an example voltage biasing is shown in accordance with one or more exemplary embodiments. The biasing voltages designed in the logic circuits 104 and the integrity cells 106 may be created to set up electric fields within the substrate 102 to aid in deflecting radiation-induced ions away from the logic circuits 104 to the integrity cell(s) 106.

On a (bottom) side of the substrate 102 opposite the logic circuits 104, a conductive plane 138 may be formed. The conductive plane 138 may be connected to a ground 140. The logic circuits 104 on the (top) side of the substrate 102 may receive the lower power supply voltage 136b (e.g., 1.8 volts). The integrity cells 106 may receive the higher power supply voltage 136a (e.g., 7.2 volts). The higher power supply voltage 136a relative to the lower power supply voltage 136b establishes voltage gradients 142 within the substrate 102 ranging from near zero volts (e.g., 0.2 volts) proximate the conductive plane 138 to near full volts (e.g., 7.2 volts) proximate the higher power supply voltage 136a. The voltage gradients 142 create electric fields 144 within the substrate 102. The electric fields 144 are aligned to direct some (e.g., negative) ions 146 away from the logic circuits 104 and toward the integrity cells 106, and direct other (e.g., positive) ions 148 away from the logic circuits 104 and toward the conductive plane 138. Thus, the ion pair 146, 148 created by the ionizing radiation 90a may have a reduced probability of corrupting the logic circuits 104 compared with a design where the integrity cells 106 are absent.

Figure 7:
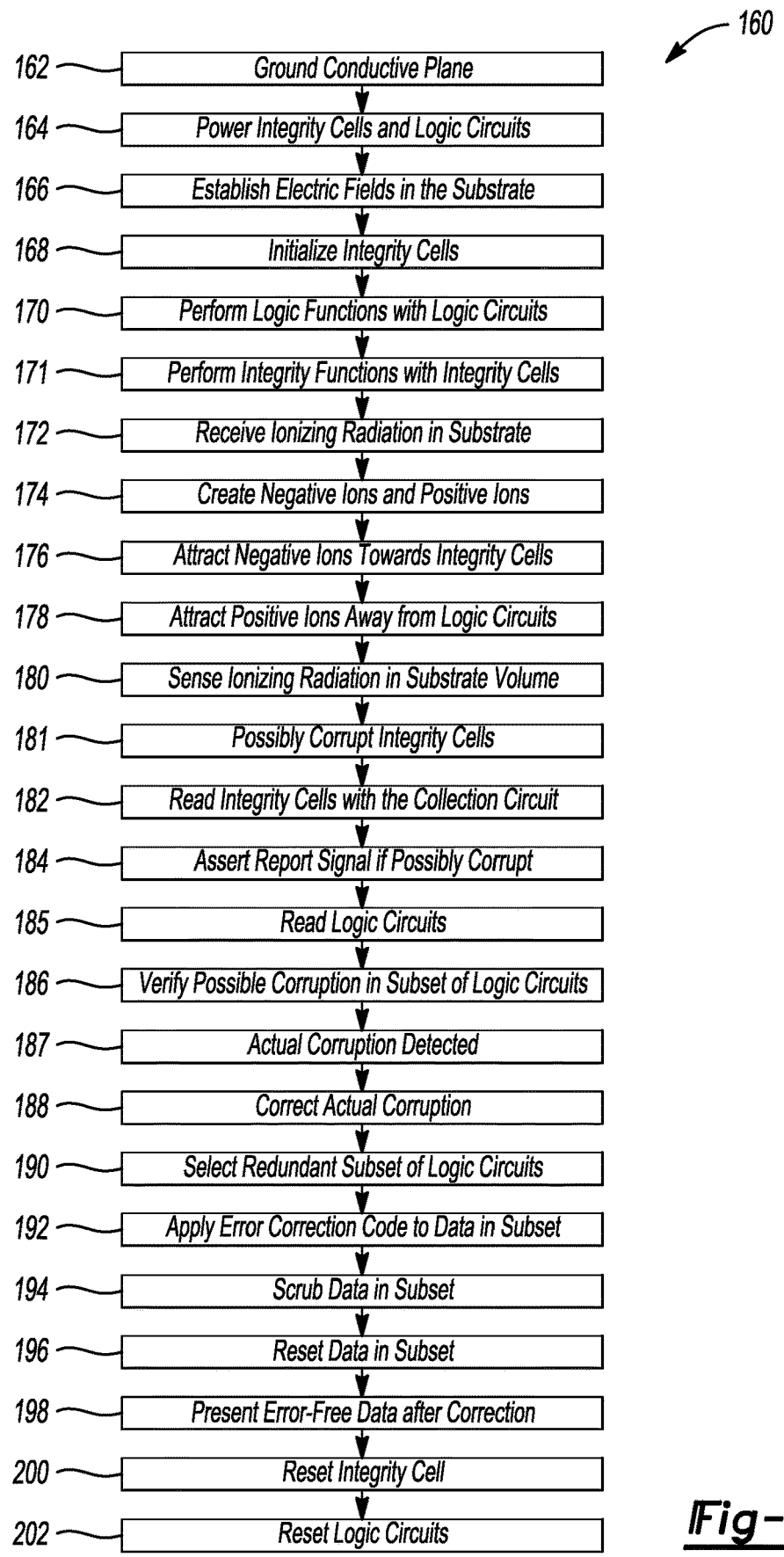
FIG. 7 is a flow diagram of a method for detecting radiation inducted errors in accordance with one or more exemplary embodiments.

Referring to FIG. 7, a flow diagram of an example method 160 for detecting radiation inducted errors is shown in accordance with one or more exemplary embodiments. The method 160 (or process) is performed by the solid-state device 100. The method 160 includes steps 162 to 202, as illustrated. The sequence of steps is shown as a representative example. Other step orders may be implemented to meet the criteria of a particular application.

In the step 162, the conductive plane 138 on a bottom of the substrate 102 is grounded 140 (e.g., zero volts). Electrical power 134a-134b is applied to the integrity cells 106 and the logic circuits 104 with different voltage(s) 136a-136b in the step 164. The difference voltages 136a-136b establish electric fields 144 in the substrate in the step 166.

In the step 168, the integrity cells 106 are initialized to the predetermined state 109. The logic circuits 104 generally perform logic functions 105 in the step 170. The integrity cells 106 perform integrity functions 107 in the step 171.

In the step 172, the solid-state device 100 receives the ionizing radiation 90a in the substrate 102. The ionizing radiation 90a creates negative ions 146 and positive ions 148 in the substrate 102 in the step 174. The electric fields 144 in the substrate 102 attract the negative ions 146 towards the integrity cells 106 and thus away from the logic circuit 104 in the step 176. The electric fields 144 also attract the positive ions 148 away from the logic circuits 104 in the step 178. A passage of the ionizing radiation 90a in the volume 114 of the substrate 102 adjacent the integrity cells 106 may be sensed in the step 180 by the integrity cells 106. The ionizing radiation 90a may cause a possible corruption of one or more integrity cells 106 in the step 181. Where the integrity cell 106 implements a memory cell, the corruption may be a bit flip of stored data.

In the step 182, the collection circuit 108 reads the integrity cells 106. Where the collection circuit 108 reads incorrect (corrupted) bits 111 from one or more of the integrity cells 106, the collection circuit 108 asserts the report signal 116 in the step 184. The report signal 116 may identify the integrity cells 106 with the incorrect bits 111. The incorrect bits 111 generally indicate that subsets of the logic circuits 104 proximate the corrupted integrity cells 106 may also be corrupted due to the ionizing radiation 90a.

In the step 185, the EDC circuit 110 reads the logic circuits 104, and optionally the integrity cell 106. The EDC circuit 110 verifies the possible corruption in the subset of logic circuits 104 (or the set of logic circuit 104 and the integrity cells 106) in the step 186 in response to the assertion of the report signal 116. If the radiation 90, 90a has corrupted one or more of the logic circuits 104 in the set/subset, the EDC circuit 110 detects the actual corruption in the step 187. The EDC circuit 110 subsequently corrects the possible corruption in the set/subset in the step 188 in response to the verification of an actual corruption.

In various embodiments, the correction may take on one or more forms. In some designs, the EDC circuit 110 may select a redundant set/subset 122b/124b of the logic circuits 104 as having valid data in the step 190. In other designs, the EDC circuit 110 applies an error correction code to the data in the set/subset in the step 192. The EDC circuit 110 may also attempt to scrub the data in the set/subset in the step 194. Sometimes the radiation 90, 90a disrupts a sufficient number of logic circuits 104 that the error correction code cannot recover the original data. Therefore, the EDC circuit 110 may reset the data in the set/subset in the step 196 and reload the set/subset from a backup data source.

In the step 198, the EDC circuit 110 may present the error-free data after the correction in the correct signal 118. The collection circuit 108 resets the corrupted integrity cells 106 back to the predetermined state 109 in the step 200 in response to reading the incorrect bits 111. In the step 202, the EDC circuit 110 may optionally reset the corrupted logic circuits 104 based on the correction(s) applied to the data if the corrupted logic circuits 104 are resettable.

Embodiments of the disclosure generally provide a technique for reducing radiation errors induced by ionization deposition in a functional semiconductor device by voltage biasing of neighboring memory and/or functional cells with respect to neighbors to deliberately collect the ionization charge away. The voltage biasing of neighboring memory and/or functional cells with respect to neighbors may deliberately induce effects in the biased cells, enhancing susceptibility to radiation upset even without ionization drift from neighboring cells. Where integrity cells are memory cells, the integrity cells may be read out in parallel with the rest of the memory and act as "parity-like" bits indicating whether data may be corrupted. Detection of a corrupted integrity cell may enable selection between two banks of memory, fetching two parallel sets of data in parallel, and selecting on a word-by-word basis which set is uncorrupted. Likewise, the detection of a corrupted integrity cell may enable a selection among functional logic circuits in an array. If a logic circuit shows possible corruption by the neighboring "detector" integrity cell, then a state of a redundant logic circuit performing the same function may be used instead (e.g., "duplicate" voting). If both logic circuits (a primary and a backup) show corruption, then a large-scale reset or scrubbing is warranted. A separate error detection and correction "engine" may also be applied to impose more elaborate consequences of detected corruption, including localized data scrubbing, localized error correction, and others.

Various embodiments provide a technique for mitigating radiation induced corruption by means of a localized electric field enhancement to divert deposited ionization charge to a collection point away from critical electronics. The electric field enhancement funnels deposited ionization charges to the integrity cells, which are biased apart from neighboring logic circuits. The local bias enhancement and internal biasing generally increase an upset vulnerability of the integrity cells. The integrity cells may also be used as indicators of total ionizing dose damage/failure.

This disclosure is susceptible of embodiments in many different forms. Representative embodiments of the disclosure are shown in the drawings and are herein described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference, or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A solid-state device comprising:
   a substrate that receives an ionizing radiation;
   a plurality of logic circuits operational to perform a plurality of logic functions, wherein the plurality of logic circuits are:
      located in an area on the substrate; and
      individually susceptible to a corruption by the ionizing radiation;

a plurality of integrity cells each initialized to a predetermined state, wherein the plurality of integrity cells are:
  located in the area on the substrate;
  arranged in a pattern such that a respective subset of logic circuits, in the plurality of logic circuits, surrounds each integrity cell of the plurality of integrity cells; and
  individually susceptible to disruption of the predetermined state in response to the ionizing radiation;
an error detection and correction circuit located on the substrate; and
a collection circuit comprising sampling circuitry located on the substrate, wherein the sampling circuitry is operational to cause the collection circuit to:
  read the plurality of integrity cells;
  assert a report signal to the error detection and correction circuit, wherein the report signal identifies the corruption in a subset of logic circuits in the plurality of logic circuits due to the ionizing radiation in response to reading an incorrect bit in an integrity cell, of the plurality of integrity cells, that is surrounded by the subset of logic circuits; and
  reset the integrity cell to the predetermined state in response to reading the incorrect bit.

2. The solid-state device according to claim 1, wherein:
the plurality of integrity cells are powered by a lower power supply voltage than the plurality of logic circuits; and
the lower power supply voltage causes the plurality of integrity cells to be more susceptible to disruption than the corruption of the plurality of logic circuits due to the ionizing radiation.

3. The solid-state device according to claim 1, wherein the error detection and correction circuit is operational to verify the corruption in the subset of logic circuits in response to the report signal from the collection circuit.

4. The solid-state device according to claim 3, wherein:
the error detection and correction circuit is further operational to correct the corruption in the subset of logic circuits in response to verification of an actual corruption.

5. The solid-state device according to claim 4, wherein:
the error detection and correction circuit is operational to respond to the corruption by one or more of (i) selection of a redundant subset of logic circuits in the plurality of logic circuits, (ii) an application of an error correction code to data in the subset of logic circuits, (iii) scrubbing the data in the subset of logic circuits, and (iv) resetting the data in the subset of logic circuits.

6. The solid-state device according to claim 1, wherein:
each subset of logic circuits surrounding a respective integrity cell, of the plurality of integrity cells, comprises one to eight logic circuits.

7. The solid-state device according to claim 1, wherein:
the plurality of integrity cells have a difference in one or more of a technology and a layout than the plurality of logic circuits; and
the difference causes the plurality of integrity cells to be more susceptible to disruption due to the ionizing radiation than the corruption of the plurality of logic circuits due to the ionizing radiation.

8. The solid-state device according to claim 1, wherein:
each integrity cell, of the plurality of integrity cells, is sensitive to the ionizing radiation in a volume of approximately one cubic micrometer in the substrate.

9. The solid-state device according to claim 1, wherein:
a higher power supply voltage of the plurality of integrity cells relative to a lower power supply voltage the plurality of logic circuits establishes a plurality of electric fields; and
the electric fields direct a plurality of ions created by the ionizing radiation away from the plurality of logic circuits.

10. A method for detecting radiation induced errors in a solid-state device, the method comprising:
receiving an ionizing radiation in a substrate of the solid-state device;
performing a plurality of logic functions with a plurality of logic circuits, wherein the plurality of logic circuits are:
  located in an area on the substrate; and
  individually susceptible to a corruption due to the ionizing radiation;
initializing each of a plurality of integrity cells to a predetermined state, wherein the plurality of integrity cells are:
  located in the area on the substrate;
  arranged in a pattern such that a respective subset of logic circuits, in the plurality of logic circuits, surrounds each integrity cell of the plurality of integrity cells; and
  individually susceptible to disruption of the predetermined state in response to the ionizing radiation;
reading the plurality of integrity cells via a collection circuit that includes sampling circuitry located on the substrate;
asserting, via the collection circuit, a report signal to an error detection and correction circuit located on the substrate, wherein the report signal identifies the corruption in a subset of logic circuits in the plurality of logic circuits due to the ionizing radiation in response to reading an incorrect bit in an integrity cell, of the plurality of integrity cells, that is surrounded by the subset of logic circuits; and
resetting, via the collection circuit, the integrity cell to the predetermined state in response to reading the incorrect bit.

11. The method according to claim 10, further comprising:
powering the plurality of integrity cells with a lower power supply voltage than the plurality of logic circuits, wherein
  the lower power supply voltage causes the plurality of integrity cells to be more susceptible to disruption than the corruption of the plurality of logic circuits due to the ionizing radiation.

12. The method according to claim 10, further comprising:
verifying the corruption in the subset of circuits via the error detection and correction circuit in response to the report signal from the collection circuit.

13. The method according to claim 12, further comprising:
correcting the corruption in the subset of logic circuits in response to verification of an actual corruption by the error detection and correction circuit.

14. The method according to claim 10, further comprising:
sensing the ionizing radiation in a volume of approximately one cubic micrometer in the substrate with each integrity cell of the plurality of integrity cells.

15. A solid-state device comprising:
a substrate that receives an ionizing radiation;
a plurality of logic circuits operational to perform a plurality of logic functions, wherein the plurality of logic circuits are:
  located in an area on the substrate; and
  individually susceptible to the ionizing radiation;
a plurality of integrity cells that are:
  located in the area on the substrate;
  arranged in a pattern such that a respective subset of logic circuits, in the plurality of logic circuits, surrounds each integrity cell of the plurality of integrity cells; and
  voltage biased relative to the plurality of logic circuits to establish a plurality of electric fields, wherein the plurality of electric fields direct a plurality of ions created by the ionizing radiation away from the plurality of logic circuits;
an error detection and correction circuit located on the substrate; and
a collection circuit comprising sampling circuitry located on the substrate, wherein the sampling circuitry is operational to cause the collection circuit to:
  read the plurality of integrity cells;
  assert a report signal to the error detection and correction circuit, wherein the report signal identifies a corruption in a subset of logic circuits in the plurality of logic circuits due to the ionizing radiation in response to reading an incorrect bit in an integrity cell, of the plurality of integrity cells, that is surrounded by the subset of logic circuits; and
  reset the integrity cell to a predetermined state in response to reading the incorrect bit.

16. The solid-state device according to claim 15, wherein:
the ionizing radiation creates a plurality of negative ions and a plurality of positive ions in the substrate;
the plurality of integrity cells receive a higher power supply voltage than the plurality of logic circuits; and
the plurality of electric fields created by the higher power supply voltage attract the plurality of negative ions away from the plurality of logic circuits.

17. The solid-state device according to claim 16, further comprising:
a conductive plane located on the substrate, and operational to attract the plurality of positive ions away from the plurality of logic circuits.

18. The solid-state device according to claim 15, wherein the plurality of integrity cells are more susceptible to disruption due to the ionizing radiation than the plurality of logic circuits.

19. The solid-state device according to claim 15, wherein the error detection and correction circuit is operational to verify the corruption in the subset of logic circuits in response to the report signal from the collection circuit.

20. The solid-state device according to claim 15, wherein:
the plurality of integrity cells have a difference in one or more of a technology and a layout than the plurality of logic circuits; and
the difference causes the plurality of integrity cells to be more susceptible to disruption due to the ionizing radiation than the corruption of the plurality of logic circuits due to the ionizing radiation.

* * * * *